United States Patent [19]
Kozel et al.

[11] 3,812,398
[45] May 21, 1974

[54] DRAIN VALVE

[75] Inventors: James A. Kozel, Elmhurst; Edwin A. Ostrowski, Mount Prospect, both of Ill.

[73] Assignee: Controls Company of America, Schiller Park, Ill.

[22] Filed: Nov. 10, 1972

[21] Appl. No.: 305,365

[52] U.S. Cl. ............................................. 251/331
[51] Int. Cl. ........................................... F16k 31/08
[58] Field of Search ............ 251/331, 335 R, 335 B

[56] References Cited
UNITED STATES PATENTS
2,188,216  1/1940  Beecher ...................... 251/331 X
1,779,503  10/1930  Swindini ...................... 251/331 X
3,034,761  5/1962  Janquart ...................... 251/331 X

*Primary Examiner*—Henry T. Klinksiek
*Attorney, Agent, or Firm*—Michael, Best & Friedlich

[57] ABSTRACT

The dishwasher drain valve provides straight through flow with the valve seat at about 45° to the flow to provide increased velocity tending to straighten the flow of elongated objects (toothpicks, etc.) and decrease chances of such debris becoming lodged in the valve housing. A bellows seals the stem and solenoid from contact with liquids and entrained contaminants. The end of the bellows functions as the valve. Collapse of the bellows onto the stem is prevented by stiffening rings. The stem is guided for linear movement and tolerates some degree of misalignment with the solenoid.

1 Claim, 1 Drawing Figure

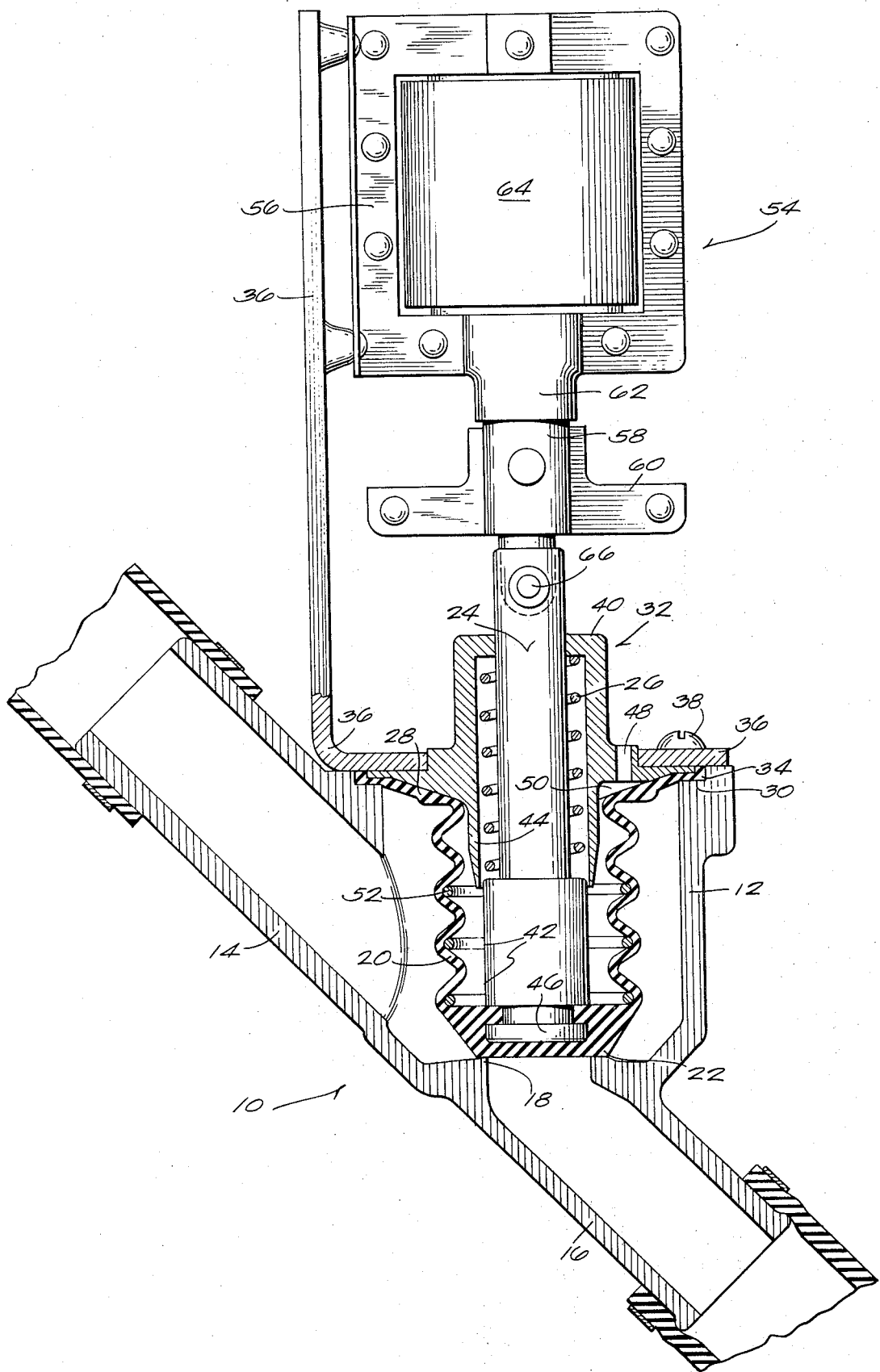

DRAIN VALVE

BACKGROUND OF THE INVENTION

The drain valve in a dishwashing machine is required to handle water containing debris flushed from the plates, etc. in the machine. Prior drain valve designs are noisy due to the solenoid operating in contaminants which can deposit on the pole piece and armature which increases the air gap and causes noise. The solenoid coil must be designed oversize to insure enough pull to overcome inefficient air gaps. The coil gets too hot and requires special switching to open the circuit prior to completion of the timer interval. Prior designs employed an inlet and an outlet at 90° and were prone to clog with debris, thus preventing complete valve closure at best and sometimes resulting in failure to operate.

SUMMARY OF THE INVENTION

With the straight through flow arrangement coupled with a valve seat at about 135° to the flow, the seat area is largely self-cleaning and additionally causes an increase in rate of flow at the seat, which tends to straighten out long pieces of material so they flow through rather than lodging around the valve. The valve itself is the lower part of a bellows which seals the valve stem and solenoid from the liquid. This permits closer air gaps and reduces the size of the coil. Noise is reduced since better seating surfaces are possible (and at less cost). Auxiliary switching is not required since the coil heat remains within reasonable bounds. The stroke is increased to move the valve far from the seat to keep it clear of the contaminants and to insure full flow.

DESCRIPTION OF THE DRAWING

The single FIGURE is a vertical section through the present valve.

DESCRIPTION OF THE PREFERRED EMBODIMENT

The valve housing 10 is an integral molded piece essentially in the form of a straight tube having a round housing portion 12. Inlet 14 and outlet 16 are separated by valve seat 18 which is approximately at 135° to the direction of flow. The round housing 12 encloses bellows 20 which has a thickened flat end 22 which functions as the valve while the bellows itself seals the stem 24 and return spring 26 from the liquid. The upper end of the bellows is provided with a flange portion 28 which fits within the annular recess 30 at the top of the housing portion 12. The stem guide member 32 fits inside the bellows lip 34 and bracket 36, which is secured to portion 12 by screws 38 (only one shown), serves to clamp the guide member 32 in position with the bellows flange 28 sealing the joint.

The upper end of stem 24 projects through the inturned end 40 of guide 32 and is of reduced diameter to accommodate the compressed closing spring 26 which seats on the annular ledge on top of the enlarged stem portion 42. The enlarged stem portion 42 guides the lower end of the stem by reason of its sliding fit in the depending guide 44. The lower end of the stem is shaped to fit within and positively engage the undercut 46 in the thickened end of the bellows. The stem guide member is provided with a vent hole 48 leading to slot 50 to vent the interior of the bellows. This prevents any dashpot effect during opening or closing of the valve. Water pressure outside the bellows could collapse the bellows against the stem and cause binding during opening of the valve. Therefore, rings 52 are mounted in the convolutions of the bellows to prevent collapse.

The bracket is turned up to provide a support for solenoid 54. The solenoid frame 56 is secured to the bracket. The armature 58 has a T-head 60 and projects through guides 62 into coil 64. The armature is connected to the upper end of stem 24 by a pin or rivet 66.

When the coil is energized, the valve is opened rapidly since the valve is essentially balanced and the bellows is vented. When the coil is de-energized, the return spring 26 can close the valve rapidly due to the vent. When the valve is open, the flow is essentially straight through from inlet to outlet. The slight restriction at the valve seat causes an increase in velocity which tends to make fish bones, toothpicks, etc. straighten out — move along parallel to the flow — and avoid "hanging up" at the seat. The seat is at about 135° to the flow and the upstream ledge around the seat will induce some swirling action which cleans out any debris in side housing 12. Experience shows this valve is a marked improvement over the prior art. Since the solenoid is located outside the liquid, better metal-to-metal contact is achieved — resulting in quieter operation. Since there is no need for stainless steel (non-magnetic) guides/seals in the magnetic path, a smaller coil is satisfactory (which is a cost reduction) and runs cooler, thus avoiding the need for separate switching to de-energize the coil prior to normal termination of the timer interval (a further cost reduction). Thus the present valve offers superior performance, quieter operation and cost reduction as well. It is not essential that the inlet and outlet be aligned — a general alignment is satisfactory so long as the flow path is not unduly changed.

We claim:

1. A drain valve for use in dishwashing machines in which there may be debris entrained in the liquid, comprising
   a housing having an inlet and an outlet in general alignment so flow through the housing is essentially straight through,
   a valve seat in the housing disposed at an obtuse angle of about 135° to the incoming flow,
   a valve stem guided in the housing and projecting through the housing for actuation externally of the valve,
   said housing including a main housing and a separate guide member in which said stem moves and through which the stem projects,
   a bellows having a flange portion at one end positioned between the guide member and the main housing to function as a seal and surrounding the stem with the other end of the bellows being connected to said valve stem to function as a valve in regulating flow past the valve seat,
   a vent from the exterior of the housing to the interior of the bellows,
   rigid rings within and supported by the bellows convolutions preventing inward collapse of the bellows convolutions onto the stem,
   a bracket securing the guide member to the main housing,
   a solenoid mounted on the bracket and having its armature pivotally connected to the stem to open the valve when the solenoid is energized,
   and a spring urging the valve to the seat.

* * * * *